Jan. 25, 1955  W. S. BOBIER, JR  2,700,276
MANUAL AND AUTOMATIC FUEL FEED CONTROL FOR GAS TURBINES
Filed April 15, 1949

W. S. Bobier Jr.
INVENTOR.

BY Stanley M. Udale

United States Patent Office 2,700,276
Patented Jan. 25, 1955

2,700,276

MANUAL AND AUTOMATIC FUEL FEED CONTROL FOR GAS TURBINES

Wilfred S. Bobier, Jr., Grosse Pointe Woods, Mich., assignor to George M. Holley and Earl Holley Application April 15, 1949, Serial No. 87,784

16 Claims. (Cl. 60—39.28)

The object of this invention is to control the fuel supply to a gas turbine.

The specific objects are: (a) To control the stroke of a variable stroke fuel pump with the speed of the gas turbine; (b) to control this speed by a variable speed centrifugal governor; (c) to substitute 100% manual control for automatic-manual governor control when the automatic-manual governor control fails to maintain the speed selected by the manual control of the centrifugal governor driven by the gas turbine; (d) to prevent the normal fluctuations in speed of the gas turbine disturbing the manual-automatic control; (e) to give the gas turbine time to reach the selected speed for the governor before switching to 100% manual control; (f) to magnetically retain the control in the manual position after it has automatically been moved to the manual position so that manual operation is required to return the device to automatic; and, (g) to provide manual means for placing the device under manual control at any time.

To accomplish these objects I drive a variable stroke fuel pump with the gas turbine. A centrifugal governor controls a valve which raises the pressure and thus shortens the stroke of the variable stroke fuel pump. The fuel then goes to the combustion chamber of the gas turbine downstream from the air compressor. A manually variable load is applied to the spring on the centrifugal governor. At the same time that the manual load on the governor is varied a spring load on a diaphragm is varied. A speed sensing device provides a load to balance this load on the diaphragm.

If, after a due interval of time, the selected speed is not reached something is wrong with the automatic control. This is reflected by the movement of the diaphragm which moves a servomotor valve which controls a slave piston.

The slave piston then throws the control valve into manual control and holds the control in its manual control position until the control is manually reset with automatic control.

During the transition from low to high speed a state of acceleration exists. In order to prevent an unnecessary shift from automatic to manual control it is necessary to prevent the shift taking place during acceleration.

Again, if the manual control is moved too rapidly to give maximum revolutions per minute the effect of this too rapid opening of the manual control must be counteracted to avoid trouble.

Figure 1:
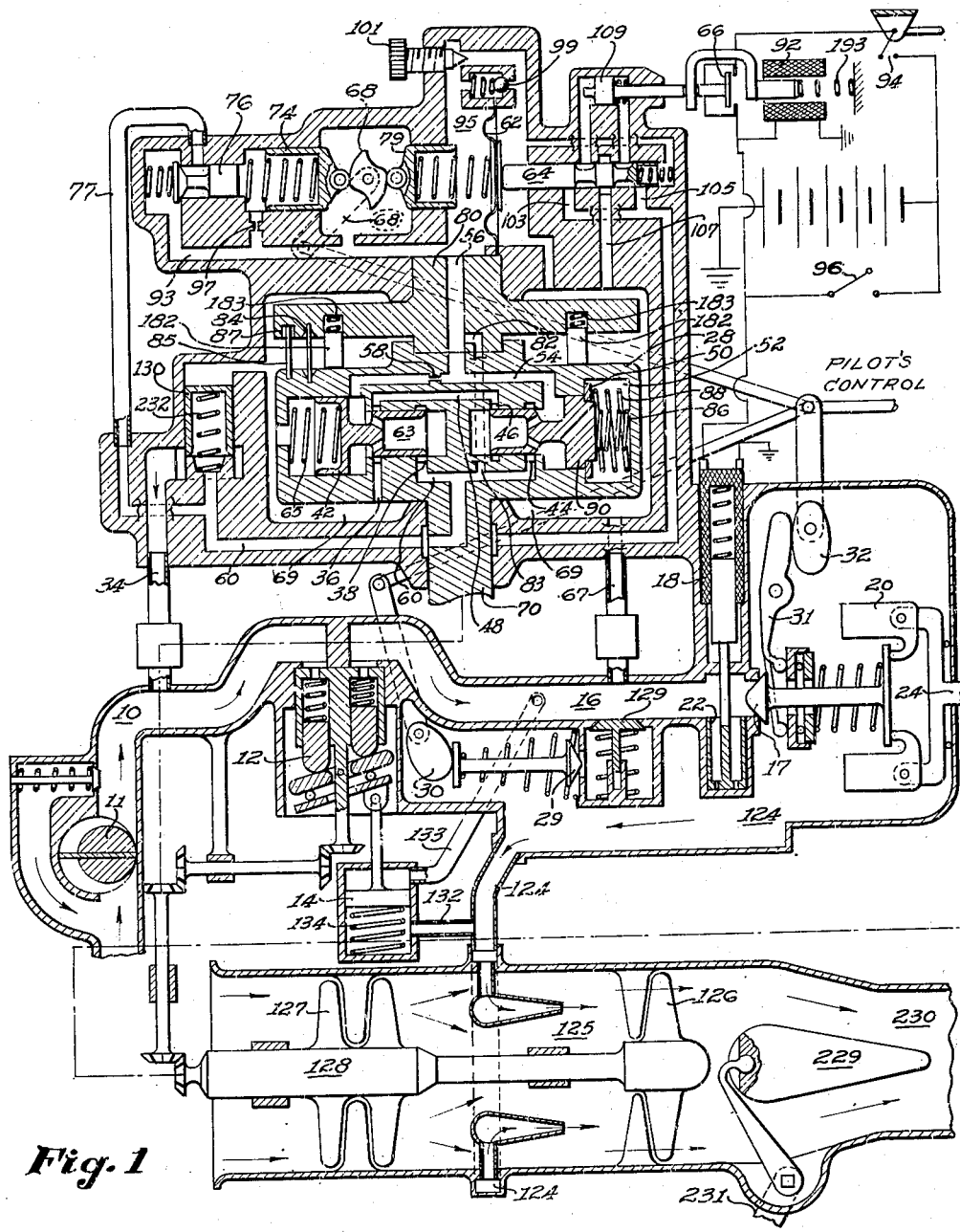
Fig. 1 shows diagrammatically the preferred form of my invention.

In the figures, 10 is the fuel entrance from a supply pump 11 delivering fuel at 15 pounds per square inch. 12 is a variable stroke pump of a well known design. 14 is a piston which controls the pressure drop across the manual automatic governor or alternatively across the 100% manual control by varying the stroke of the pump 12. 16 is the outlet from the pump 12 leading to the valve 17 controlled by the centrifugal governor 20 driven by the shaft 24, past the shut-off valve 22, controlled by the electric solenoid 18.

The 100% manual control is shown at valve 29 controlled by cam 30 which control derives its fuel from a spring loaded valve 129 located upstream of the shut-off valve 22. Passage 124 delivers fuel both from the governor control valve 17 and from the valve 29 to the combustion chamber 125 which provides the motive power of the gas turbine 126, which gas turbine drives the air compressor 127 through the shaft 128. A conical valve 229, in the outlet 230, is controlled by a lever 231. Passage 132 connects the passage 124 with the underside of piston 14. Passage 133 connects the passage 16 with the upper side of piston 14. Spring 134 supports the piston 14 against the pressure transmitted to passage 133 and regulates the stroke of the fuel pump 12 in a well known manner. Cam 32 controls the governor 20—24 through a forked lever 31. Cam 68 controls the speed responsive selecting device, the subject of this application. Cams 30—32—68 are all connected together, as indicated by the broken lines, and to the pilot's control.

Emergency control

A shaft 70 driven by the gas turbine carries a rotating wheel 28 in which there are two pistons responsive to centrifugal force:
(a) A piston 42 located to the left.
(b) A piston 90 located to the right.

A light spring 65 pushes the piston 42 to the right. A passage 67, connected downstream to the outlet 16 of the pump 12, delivers pump pressure to the chamber 69 in which the wheel 28 revolves.

A chamber 63, to the right of piston 42, is maintained at a lower pressure by the passage 60 which is connected through the constant pressure valve 130 loaded by a spring 232 to a passage 34 which is at a pressure of about 15 pounds per square inch.

The low pressure pipe 34 returns fuel to the fuel entrance 10.

Ports 36 and 38 are controlled by the piston 42. Port 36 is connected with the high pressure fuel in chamber 69. Low pressure fuel in passage 60 is connected to the port 38.

The pressure in chamber 63 is thus held at a value which decreases as the speed increases in order that the piston 42 is held in the neutral position in which it is shown. A light spring 65 is provided for initial stability.

The right hand piston 90 also controls two ports. Port 44 is connected with the low pressure fuel in passage 60. Port 46 is connected with the high pressure fuel in chamber 69 through the passage 48 which is also connected to the high pressure port 36.

Springs 86 and 88 urge the piston 90 towards the left and centrifugal force urges piston 90 to the right and piston 42 to the left.

A washer 50 is seated by the spring 88 and acts as the low speed stop to piston 90. Low speed spring 86 pushes the piston 90 to the left so that port 44 admits low pressure fuel to the chamber 52 at the lowest possible speeds. This prevents the change-over to manual from taking place at the lowest speeds.

Chamber 52 communicates through the passage 54 with the passage 56 in the center of the inertia flywheel 80, driven by the rotating wheel through two springs; (a) spring 84 which is always active, and (b) spring 85 which is intermittently active (see Fig. 2). The spring 84 is relatively the weaker of the two. Spring 85 comes into action when prolonged acceleration takes place, not mere torsional vibration.

To prevent the emergency system acting before the gas turbine has had time to accelerate to the new speed selected by the cams 32 and 68 the inertia device 80 and ports 82 and 83 are provided. During acceleration ports 82 and 83 line up with each other.

An opening 87 provides clearance for the end of the spring 85 so that the normal torsional vibrations in the driving element 28 have no effect. Friction dampening pistons 182 and springs 183 limit the motion between the wheel 28 and the flywheel 80.

Chamber 63, inside the piston 42, corresponds to chamber 52 to the right of the piston 90 and communicates through a restriction 58 with passage 56.

Passage 93 is connected at right angles to the left of passage 56 and to the chamber 95, which is located on the left of a diaphragm 62.

The manually operated cam 68 engages with two spring loaded pistons, 74 to the left and 79 to the right. Each piston carries a roller which rides on the cam 68. A restriction 97 communicates with the speed regulated pressure in passage 93 and thus applies this pressure to the left side of piston 74.

A spring loaded free piston 76 acts as a valve to admit low pressure fuel from passage 77 and 60 to passage 93 whenever the cam 68 is rotated anti-clockwise at such a rapid rate that the pressure built up due to restriction 97 is sufficient to move the spring loaded piston 76 to the left. When this happens the motion of the servomotor valve 64 to the right is delayed, otherwise this motion would take place every time the cam was moved quickly counter-clockwise to accelerate the gas turbine.

The motion to the right of the servomotor valve 64 is also checked by the spring loaded check valve 99 and this action of the check valve is modified by the adjustable valve 101.

Two low pressure ports 103 and 105 are controlled by the servomotor valve 64 which also controls a high pressure port 107 connected to the chamber 69. A small piston 109 is the "slave" piston of the servomotor valve 64 to "make" the electrical contact 66 so as to operate the solenoids 18 and 92.

The reset switch 94 (normally closed) must be opened and permit the spring 193 to reopen the switch 66 and to replace the piston 109 in the position shown. This is to restore automatic control.

*Operation*

Figure 2:
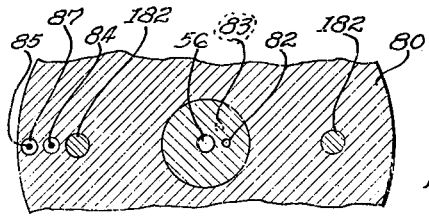
Fig. 2 shows in elevation a portion of the acceleration responsive element.

Assume that the parts are in the position shown in Figs. 1 and 2 except that switch 94 is closed. Then assume that the speed attained by the gas turbine is below that selected by the cams 32 and 68. The valve 22 is closed by the solenoid 18 controlled by the switch 66. The valve 29 then assumes control and from then on the control is by the 100% manually operated cam 30 and valve 29.

In both normal (governor) and emergency (100% manual) control the drop in pressure from passage 16 to passage 124 controls the stroke in the fuel pump 12 so that when the 100% manually operated valve 29 closes and alternatively as the governor controlled valve 17 closes the stroke of the pump 12 is reduced.

The piston 90, washer 50, low speed spring 86 and high speed spring 88 are provided to take care of minimum and maximum speed.

At minimum speed the spring 86 pushes the piston 90 to the left, admits the low pressure fuel to passage 56, to the left hand side of the diaphragm 62, and prevents servomotor valve 64 from moving to the right and therefore prevents the operation of the solenoids 18 and 92.

The maximum speed is limited by the spring 88. When this maximum speed spring yields, the piston 90 travels to the right from the position in which it is shown and high pressure fuel is admitted around the piston 42, through the port 36, along the passage 48, through the piston 90, along the passage 56, to the left hand side of the diaphragm 62. When this occurs the pressure on both sides of the diaphragm 62 are equal and the spring inside the piston 79 pushes the servomotor valve 64 over to the right and both solenoids 92 and 18 are made active so that the shut-off valve 22 closes the solenoid 92 and holds the switch 66 closed until the reset switch 94 is manually opened. This, of course, takes care of the situation when the governor 20 fails to control the fuel valve 17 and the turbine shows a tendency to attain a dangerous speed. This is an invention disclosed in my co-pending application Serial No. 783,071, filed October 30, 1947.

If it is desired to test (that is to check) the performance of the manual control at any time a second manually operated switch 96 may be provided to short circuit the automatic switch 66 and the first manually operated switch 94.

What I claim is:

1. Main and emergency fuel controls for a gas turbine power plant having the usual air entrance and air compressor leading to a combustion chamber, a first spring loaded speed responsive device acting as a governor driven by said turbine, a source of fuel under pressure, a fuel passage containing a fuel valve controlled by said governor and discharging into said combustion chamber, a first manual control means acting on the spring loading of said governor in order to vary the governed speed, a fuel shut-off valve located in said fuel passage between the source of fuel under pressure and the combustion chamber, automatic means to close said shut-off valve responsive to the failure of the governor controlled fuel valve to cause the gas turbine to attain the manually selected speed after acceleration has ceased, comprising a spring loaded servomotor valve, a second manual control means, said means increasing the spring load on said servomotor valve when high speed is called for, a turbine driven second speed responsive device to generate a hydraulic pressure that decreases with speed, a moving wall responsive to the decrease in said hydraulic pressure which opposes the spring load on said servomotor valve, acceleration delaying means associated with said second speed responsive device to delay the action of said second speed responsive device and said servomotor valve including a bypass that is held open to decrease the hydraulic pressure until acceleration is completed, an emergency outlet upstream of said shut-off valve, a spring loaded valve in said outlet, a passage from said outlet into the combustion chamber of said gas turbine, a third manual control, a valve connected thereto to control the flow through said outlet in series with said spring loaded valve and linkage between said first, second and third manual controls so that they are all moved simultaneously.

2. A device as set forth in claim 1 in which the acceleration delaying means comprises a flywheel rotatably mounted on a driving shaft, a relatively weak first yieldable driving mean therefor, a relatively strong second yieldable driving means initially loose and becoming operative to drive the flywheel after the first yieldable means has yielded a predetermined amount, means responsive to the relative movement of the flywheel on its driving shaft after the second yieldable means has become operative to check the action of said speed responsive means and said servomotor valve by preventing the decrease in hydraulic pressure becoming effective to move the servomotor valve during acceleration.

3. A device as set forth in claim 1 in which the acceleration delaying means comprises a flywheel rotatably mounted on a driving shaft, a relatively weak first yieldable driving means therefor, a relatively strong second yieldable driving means initially loose and becoming operative to drive the flywheel after the first yieldable means has yielded a predetermined amount, means responsive to the relative movement of the flywheel on its driving shaft after the second yieldable means has become operative to check the action of said speed responsive means and said servomotor valve by preventing the decrease in hydraulic pressure becoming effective to move the servomotor valve during acceleration and in which there are frictional dampening means to check oscillations between the driving shaft and the driven flywheel.

4. A device as set forth in claim 1 in which there are positive holding means by means of which the servomotor valve is positively held in the position into which it is moved by the action of the speed responsive means after acceleration has ceased, manually operated means to reset the servomotor valve.

5. A device as set forth in claim 1 in which there is an electrically operated solenoid operatively associated with said shut-off valve, a source of electricity, an electric circuit including said solenoid, a switch in said circuit operated by said servomotor valve.

6. A device as set forth in claim 1 in which there is a first electrically operated solenoid operatively associated with said shut-off valve, a source of electricity, an electric circuit including said solenoid, a switch in said circuit operated by said servomotor valve, a yieldable second solenoid in said circuit adapted to hold the switch in its operating position in spite of the action of the servomotor valve, a manually operated normally closed switch in said circuit to cut off the source of electricity so as to reset the first mentioned switch in its operable open position.

7. Main and emergency fuel controls for a gas turbine power plant having the usual air entrance and air compressor leading to a combustion chamber, a first spring loaded speed responsive governor driven by said turbine, a source of fuel under pressure, a fuel outlet, a fuel passage connected thereto and containing a fuel valve controlled by said governor and discharging into said combustion chamber, a first manual control means acting on the spring loading of said governor to vary the governed speed, a fuel shut off located in said fuel passage between the source of fuel under pressure and the combustion chamber, automatic means to close said shut-off valve responsive to the failure of the governor controlled fuel valve to cause the gas turbine to attain the manually selected speed after acceleration has ceased, comprising a hydraulic system having a turbine driven rotating disc, a radial passage in said disc, a piston reciprocating in said passage, high pressure fuel acting on the end of said piston, two ports controlled by said piston, one admitting fuel under pressure to said piston at low turbine speeds and the other permitting fuel under pressure to escape from said cylinder at high turbine speeds so that the pressure on the inner end of said piston aided by centrifugal force just balances the high pressure fuel acting on the outer end of the said piston so that the pressure on the inner end of said piston decreases as speed increases, a loose fly wheel mounted on said rotating disc, a relatively weak spring arranged to drive said flywheel at all times, a relatively stiff spring adapted to supplement the spring driving means at a predetermined rate of acceleration, two ports controlled by the relative motion of the flywheel and disc, one port in this flywheel connected to the speed responsive fuel pressure the other port being a relatively low pressure escape port located relative to the first port so as to allow said speed responsive pressure to escape when the predetermined rate of acceleration is exceeded, a spring loaded servomotor, a second manual control means, said second means increasing the spring load on said servomotor valve when high speed is called for, means including a moving wall responsive to the decrease in speed responsive fuel pressure opposing the spring load on said servomotor valve so as to move said servomotor valve when the selected speed is not attained so as to close said shut-off valve, an emergency outlet located upstream of said shut-off valve, a spring loaded valve in said outlet, a passage from said outlet into said combustion chamber of said gas turbine, a third manual control, a valve controlled thereby to control the flow through said outlet passage, means for simultaneously operating the said first, second, and third manual controls.

8. A device as set forth in claim 7 in which the means responsive to the speed responsive fuel pressure which moves the servomotor valve to close said shut-off valve includes an electric circuit and two solenoids in said circuit, a manually operated switch in said circuit and an automatic switch in said circuit operated by said servomotor valve so as to activate said two solenoids, one of the solenoids acting to close the shut-off valve and the other to hold the automatic switch in its closed position so as to hold the shut-off valve closed, the manually operated switch being thus adapted to reset the automatic switch in its open position when the manually operated switch is momentarily reopened.

9. Main and emergency fuel controls for a gas turbine power plant having the usual air entrance and air compressor leading to a combustion chamber, a first spring loaded speed responsive device acting as a governor driven by said turbine, a source of fuel under pressure, a fuel passage containing a fuel valve controlled by said governor and discharging into said combustion chamber, a first manual control means acting on the spring loading of said governor in order to vary the governed speed, a fuel shut-off valve located in said fuel passage between the source of fuel under pressure and the combustion chamber, automatic means to close said shut-off valve responsive to the failure of the governor controlled fuel valve to cause the gas turbine to attain the manually selected speed after acceleration has ceased, comprising a spring loaded servomotor valve, a second manual control means, said means varying the spring load on said servomotor valve when high speed is called for, a turbine driven second speed responsive device to generate a hydraulic pressure that varies with speed, a moving wall responsive to the variation in said hydraulic pressure which opposes the spring load on said servomotor valve, acceleration delaying means associated with said second speed responsive device to delay the action of said second speed responsive device and said servomotor valve including a bypass that is held open to prevent the action of the hydraulic pressure until acceleration is completed, an emergency outlet upstream of said shut-off valve, a spring loaded valve in said outlet, a passage from said outlet into the combustion chamber of said gas turbine, a third manual control, a valve connected thereto to control the flow through said outlet in series with said spring loaded valve and linkage between said first, second and third manual controls so that they are all moved simultaneously.

10. A device as set forth in claim 9 in which the acceleration delaying means comprises a flywheel rotatably mounted on a driving shaft, a relatively weak first yieldable driving means therefor, a relatively strong second yieldable driving means initially loose and becoming operative to drive the flywheel after the first yieldable means has yielded a predetermined amount, means responsive to the relative movement of the flywheel on its driving shaft after the second yieldable means has become operative to check the action of said speed responsive means and said servomotor valve by preventing the variation in hydraulic pressure becoming effective to move the servomotor valve during acceleration.

11. A device as set forth in claim 9 in which the acceleration delaying means comprises a flywheel rotatably mounted on a driving shaft, a relatively weak first yieldable driving means therefor, a relatively strong second yieldable driving means initially loose and becoming operative to drive the flywheel after the first yieldable means has yielded a predetermined amount, means responsive to the relative movement of the flywheel on its driving shaft after the second yieldable means has become operative to check the action of said speed responsive means and said servomotor valve by preventing the variation in hydraulic pressure becoming effective to move the servomotor valve during acceleration and in which there are frictional dampening means to check oscillations between the driving shaft and the driven flywheel.

12. A device as set forth in claim 9 in which there are positive holding means by means of which the servomotor valve is positively held in the position into which it is moved by the action of the speed responsive means after acceleration has ceased, manually operated means to reset the servomotor valve.

13. A device as set forth in claim 9 in which there is an electrically operated solenoid operatively associated with said shut-off valve, a source of electricity, an electric circuit including said solenoid, a switch in said circuit operated by said servomotor valve.

14. A device as set forth in claim 9 in which there is a first electrically operated solenoid operatively associated with said shut-off valve, a source of electricity, an electric circuit including said solenoid, a switch in said circuit operated by said servomotor valve, a yieldable second solenoid in said circuit adapted to hold the switch in its operating position in spite of the action of the servomotor valve, a manually operated normally closed switch in said circuit to cut off the source of electricity so as to reset the first mentioned switch in its operable open position.

15. A device as set forth in claim 9 in which there is a first electrically operated solenoid operatively associated with said shut-off valve, a source of electricity, an electric circuit including said solenoid, a switch in said circuit operated by said servomotor valve, a yieldable second solenoid in said circuit adapted to hold the switch in its operating position in spite of the action of the servomotor valve, a manually operated normally closed switch in said circuit to cut off the source of electricity so as to reset the first mentioned switch in its operated open position, and in which there is a normally open circuit having a manually operated and normally open switch which when closed short circuits the first mentioned electric circuit so as to permit the pilot to select manual control at any time.

16. A device as set forth in claim 9 in which there is an electrically operated solenoid operatively associated with said shut-off valve, a source of electricity, an electric circuit including said solenoid, a switch in said circuit operated by said servomotor valve and in which there is a normally open circuit having a manually operated and normally open switch which when closed short circuits the first mentioned electric circuit so as to permit the pilot to select manual control at any time.

No references cited.